F. LE PIANE.
LEVEL INDICATOR FOR GASOLINE TANKS.
APPLICATION FILED JAN. 9, 1922.
1,432,069.
Patented Oct. 17, 1922.
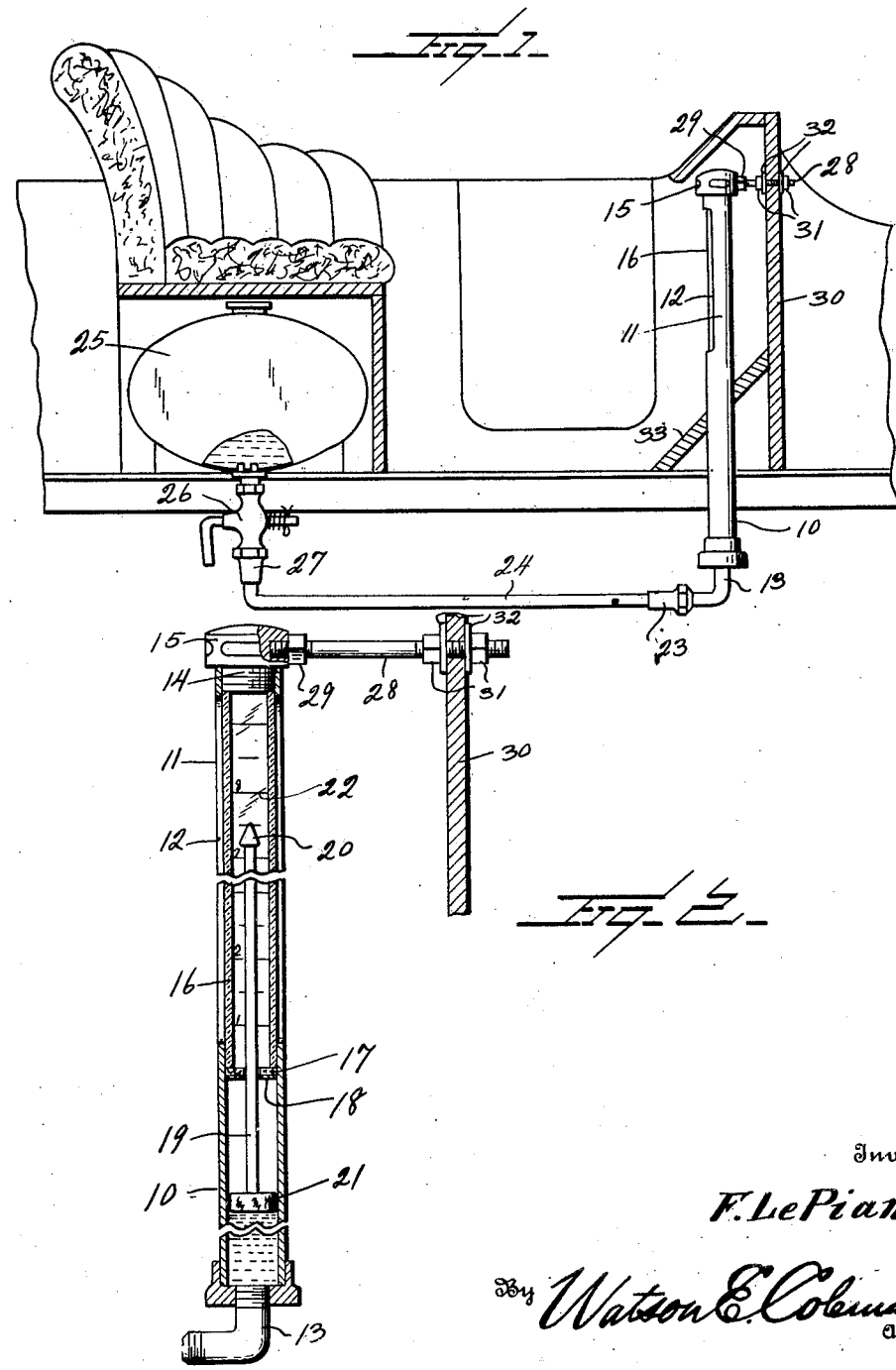

Patented Oct. 17, 1922.

1,432,069

UNITED STATES PATENT OFFICE.

FRANK LE PIANE, OF TRENTON, NEW JERSEY.

LEVEL INDICATOR FOR GASOLINE TANKS.

Application filed January 9, 1922. Serial No. 528,051.

*To all whom it may concern:*

Be it known that I, FRANK LE PIANE, a citizen of the United States, residing at Trenton, in the county of Mercer and State of New Jersey, have invented certain new and useful Improvements in Level Indicators for Gasoline Tanks, of which the following is a specification, reference being had to the accompanying drawings.

This invention relates to automobile attachments, and particularly to means for indicating the level of gasoline in the gasoline tank of an automobile.

The general object of this invention is to provide a very simple attachment for indicating the height of gasoline in the gasoline tanks of automobiles, which attachment is capable of being readily applied to gasoline tanks without altering the feed mechanism of the carbureter and without any change in the tank other than merely connecting it to the attachment.

A further object is to provide a construction of this character which may be applied by any mechanic, which may be easily put in place on any particular type of car, and which is thoroughly effective for the purpose designed.

Other objects will appear in the course of the following description.

My invention is illustrated in the accompanying drawings, wherein:—

Figure 1 is a sectional view of an automobile showing my improvement applied to the gasoline tank and dash board thereof;

Figure 2 is a vertical sectional view of a portion of the dash board of a vehicle;

Referring to these drawings, it will be seen that my attachment comprises a stand pipe 10 which is of metal, and mounted upon the upper end of this stand pipe is a tubular shell 11, also of metal, and provided with the longitudinally extending slots 12. The lower end of the stand pipe 10 is connected to an elbow nipple 13 screw-threaded at its opposite ends. The upper end of the metal shell 11 is interiorly screw-threaded for the reception of the hub 14 of a metallic cap 15. Disposed within the shell 11 is a glass tube 16, the upper end of which is engaged by the hub 14 and the lower end of which rests upon a felt washer or gasket 17 supported upon a diaphragm or annular partition 18.

Passing through this partition 18 is an indicating rod 19, the upper end of which is formed with an indicating head 20 and the lower end of which carries a float 21 which may be made of cork or other suitable material. A scale 22 is disposed in proper relation to the glass tube and within the glass tube so that the height of the head 20 in the upper end of the indicating rod may be noted.

The elbow 13 is connected by a coupling 23 to a longitudinally extending pipe 24 disposed beneath the floor of the automobile and operatively connected to the gasoline tank 25 by means of the stop cock 26 and the coupling 27. The cap or head 15 has an interiorly screw-threaded recess in one face for the reception of a stay bolt 28 carrying a lock nut 29, this stay bolt being screw-threaded for passage through the dash board 30 of the vehicle and carrying the two nuts 31 and the two washers 32 whereby the stay bolt may be clamped in place upon the dash board. The stay bolt will thus support the upper end of the gauge and hold it firmly in position, the lower portion of the gauge passing through the foot board 33 and through the floor. Thus the gauge is fully supported against vibrations which would tend to separate the parts.

The metal shell 11 which encloses the gauge glass may be integral with the stand pipe 10 or be made in a separate piece and soldered thereto. It will be obvious that with this construction the height of gasoline within the tank 25 may be easily observed at all times and that the gauge is disposed in front of the dash and, therefore, in full view of the driver of the vehicle. Furthermore, it will be noted that but very little work is necessary in order to place this attachment in position and that there is no necessity of building this gauge into the tank or into the automobile at the time the tank or automobile are made in the factory. The device can be attached to any automobile in fifteen minutes by cutting a small hole in the bottom of the tank and fitting the stop cock 26 thereto and soldering the same in place. This gauge is intended primarily for Ford automobiles and such other motor cars as have the gasoline tank beneath the front seat. The gauge stands perpendicular to the floor boards, about two-thirds of the gauge being visible. The pipe connecting the gauge with the gasoline tank is disposed beneath the floor boards of the car and does not in any way interfere with the free movement of the driver or occupant of the car.

It will be obvious, of course, that the float 21 will be at all times level with the gasoline in the tank and that the indications on the gauge glass will be correlated with the float so as to indicate precisely the amount of gasoline in the tank.

I claim:—

An attachment of the character described comprising a stand pipe, the upper portion of the stand pipe being slotted, a gauge glass disposed in the upper portion of the pipe and having a scale correlated therewith, a float disposed in the lower portion of the stand pipe and having a rod extending up into the gauge glass, means adapted to connect the lower portion of the stand pipe with the bottom of the gasoline tank, a detachable cap closing the upper end of the stand pipe and holding the gauge glass in place and having a screw-threaded socket in one face, and a supporting bracket having screw-threaded engagement with the socket and having dash board clamping nuts thereon.

In testimony whereof I hereunto affix my signature.

FRANK LE PIANE.